(12) United States Patent
Baharav et al.

(10) Patent No.: US 7,176,905 B2
(45) Date of Patent: Feb. 13, 2007

(54) ELECTRONIC DEVICE HAVING AN IMAGE-BASED DATA INPUT SYSTEM

(75) Inventors: Izhak Baharav, San Jose, CA (US); Russell M. Iimura, Sunnyvale, CA (US); Xuemei Zhang, Mountain View, CA (US); Dietrich W. Vook, Menlo Park, CA (US); Ramakrishna Kakarala, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 307 days.

(21) Appl. No.: 10/368,717

(22) Filed: Feb. 19, 2003

(65) Prior Publication Data

US 2004/0160420 A1  Aug. 19, 2004

(51) Int. Cl.
G09G 5/00  (2006.01)

(52) U.S. Cl. .................. 345/175; 178/18.09; 178/18.11
(58) Field of Classification Search ................ 345/168, 345/169, 170, 173–178, 156; 178/18.01, 178/18.09, 18.11
See application file for complete search history.

(56) References Cited

U.S. PATENT DOCUMENTS

| 5,016,008 | A |   | 5/1991  | Gruaz et al.    |         |
|-----------|---|---|---------|-----------------|---------|
| 5,584,054 | A |   | 12/1996 | Tyneski et al.  |         |
| 5,942,761 | A |   | 8/1999  | Tuli            |         |
| 6,040,824 | A | * | 3/2000  | Maekawa et al.  | 345/173 |
| 6,061,177 | A | * | 5/2000  | Fujimoto        | 359/443 |
| 6,198,485 | B1| * | 3/2001  | Mack et al.     | 345/419 |
| 6,218,967 | B1| * | 4/2001  | Maula           | 341/31  |
| 6,353,428 | B1| * | 3/2002  | Maggioni et al. | 345/157 |
| 6,462,941 | B1| * | 10/2002 | Hulick et al.   | 361/683 |
| 6,504,143 | B2| * | 1/2003  | Koops et al.    | 250/221 |
| 6,512,507 | B1| * | 1/2003  | Furihata et al. | 345/157 |
| 6,677,932 | B1| * | 1/2004  | Westerman       | 345/173 |
| 6,710,770 | B2| * | 3/2004  | Tomasi et al.   | 345/168 |
| 6,803,906 | B1| * | 10/2004 | Morrison et al. | 345/173 |
| 2002/0075240 | A1 |   | 6/2002 | Lieberman et al. |        |
| 2002/0109677 | A1 | * | 8/2002 | Taylor           | 345/173 |
| 2003/0092470 | A1 | * | 5/2003 | Kurakane         | 455/566 |
| 2004/0136564 | A1 | * | 7/2004 | Roeber et al.    | 382/100 |
| 2004/0164968 | A1 | * | 8/2004 | Miyamoto         | 345/173 |

FOREIGN PATENT DOCUMENTS

| JP | 2001 350586  | 12/2001 |
|----|--------------|---------|
| WO | WO 02/31807  | 4/2002  |
| WO | WO02/054169  | 7/2002  |

OTHER PUBLICATIONS

European Search Report dated Sep. 29, 2005.

* cited by examiner

*Primary Examiner*—Amr A. Awad
*Assistant Examiner*—Steve Holton

(57) ABSTRACT

Electronic devices having image-based data input systems are described. In one aspect, an electronic device includes a window, multiple indicia, an image sensor, and a data input processor. The window has a contact surface with an input region. The multiple indicia are viewable in the input region of the contact surface. The image sensor is constructed and arranged to produce image signals corresponding to images of the input region. The data input processor is coupled to the image sensor and is operable to produce input signals based on image signals produced by the image sensor and a mapping between areas of the input region images and locations of the input indicia.

21 Claims, 4 Drawing Sheets

ELECTRONIC DEVICE HAVING AN IMAGE-BASED DATA INPUT SYSTEM

BACKGROUND

The number of different portable electronic devices is proliferating rapidly. Among the large number of portable devices that have been developed are cellular telephones, two-way radios, cordless telephones, handheld computers (e.g., personal digital assistants), and handheld audio players (e.g., MP3 players). In addition to the recent trend of combining the functionality of different portable electronic devices into a single device, manufacturers increasingly are incorporating additional functionality into portable electronic devices. For example, cameras recently have been incorporated into cellular telephones.

Many different data input schemes have been developed for portable electronic devices. For example, a cellular telephone typically includes an alphanumeric keypad in which a number and three or four letters are assigned to each key. To dial a number, a user simply depresses the key assigned to the desired number. To input a letter, on the other hand, a user must depress the key corresponding to the desired letter one or more times until the desired letter appears on the cellular telephone display screen. Some portable electronic devices include a touch screen display that displays an output and receive a touch input. Software may be used to display on the touch screen display icons, which may represent buttons or keys. A user may activate a desired function by touching the touch screen display region displaying the button corresponding to the desired function.

SUMMARY

The invention features electronic devices that leverage the functionality of an on-board image sensor to provide an image-based data input system that may be implemented with a relatively small area.

In one aspect, the invention features an electronic device that includes a window, multiple indicia, an image sensor, and a data input processor. The window has a contact surface with an input region. The multiple indicia are viewable in the input region of the contact surface. The image sensor is constructed and arranged to produce image signals corresponding to images of the input region. The data input processor is coupled to the image sensor and is operable to produce input signals based on image signals produced by the image sensor and a mapping between areas of the input region images and locations of the input indicia.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
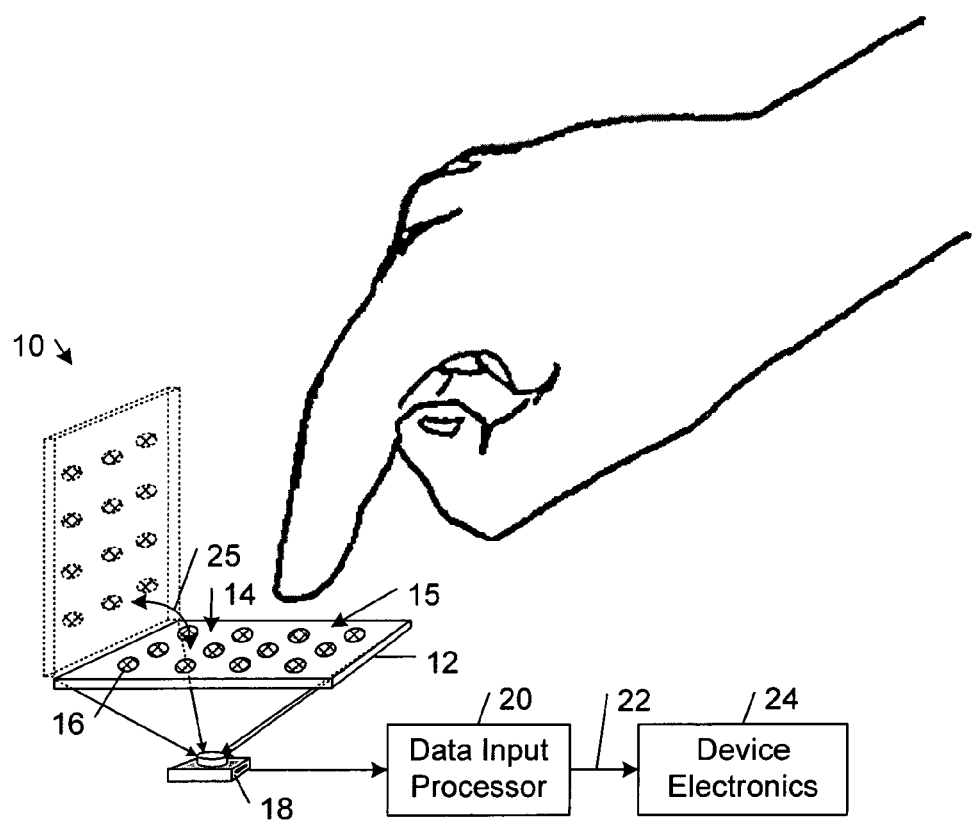
FIG. 1 is diagrammatic view of a finger in the process of selecting one of multiple indicia disposed on a contact surface of a window in an input region of a data input system.

Referring to FIG. 1, in some embodiments, a data input system 10 for an electronic device includes a window 12 having a contact surface 14 with an input region 15, multiple indicia 16 that are viewable in the input region 15, an image sensor 18, and a data input processor 20. The indicia 16 may resemble data input keys (e.g., numeric keys, alphanumeric keys, or other input keys, such as keys controlling a specific functionality of the electronic device). The indicia 16 may be implemented as markings that are made on the top of contact surface 14. Alternatively, indicia 16 may be implemented as markings that are made on another surface of window 12 and are viewable through window 12. In some embodiments, window 12 is substantially transparent to light within a target wavelength range (e.g., visible or infrared light) and image sensor 18 detects light within the target wavelength range. Image sensor 18 is constructed and arranged to produce image signals corresponding to images of the input region. Data input processor 20 is coupled to the image sensor 18 and operates to produce input signals 22 based on image signals produced by image sensor 18 and a mapping between areas of the input region images and locations of the displayed indicia. The input signals 22 are passed to device electronics 24, which respond to the input signals 22 in a conventional way.

In some embodiments, the field of view of image sensor 18 is large enough to encompass the input region. In some of these embodiments, image sensor 18 is implemented as a conventional miniature camera module that has a focal point located a distance (e.g., on the order of 1 meter or more) beyond contact surface 14 that is sufficient to capture images of a scene of interest. In these embodiments, the indicia 16 are out of focus and, therefore, only insubstantially affect the quality of the captured images. In some embodiments, window 12 is movable (e.g., on a hinge or in a slot) into and out of the field of view of the image sensor 18, as shown by the dashed-line features and indicated by arrow 25 in FIG. 1.

In operation, a user contacts an area of the input region with an object (e.g., a finger 26 or a stylus). Image sensor 18 captures an image of the input region 15 and transmits the image signals to data input processor 20. Using one or more of the image processing techniques described in detail below, data input processor 20 operates to process the input region image to determine the location of the contacted area even though the image captured by image sensor 18 is out of focus in some embodiments. Based on a correspondence between the location of the contacted area and the location of the input indicium, data input processor 20 operates to transmit to device electronics 24 signals indicative of the indicium 16 most likely to have been selected by the user. The device electronics 24, in turn, generate a response in a conventional way. For example, the device electronics 24 may respond to a numeric or alphanumeric input by displaying the corresponding number or letter on a display screen. If incorporated into a cellular telephone, device electronics 24 may respond to a "call" input button by placing a cellular telephone call.

Figures 2, 3:
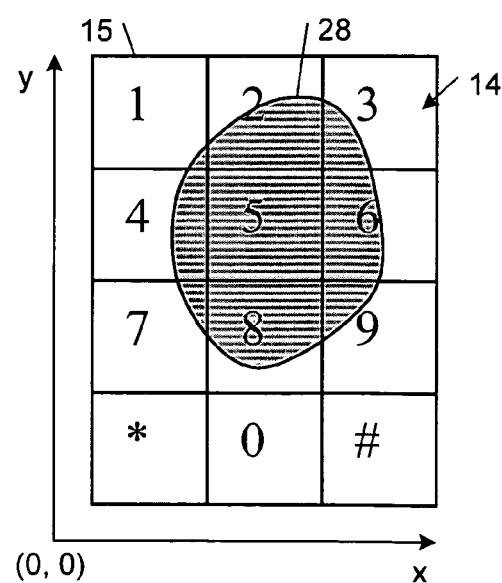
FIG. 2 is a diagrammatic view of an input region containing multiple indicia representing keys of a cellular telephone keypad.
FIG. 3 is a diagrammatic view of a shadow of a finger tip superimposed on the input region of FIG. 2.

Referring to FIGS. 2 and 3, in one exemplary implementation, indicia 16 resemble keys of a cellular telephone keypad. When a user contacts an area 28 in the input region 15 of the contact surface with finger 26, the touched locations of the contact surface 14 are distinguishable from other input region areas based on pixel intensity differences in the input region images captured by image sensor 18. For example, in the illustrated embodiment, the contacting area of finger 26 blocks ambient light from reaching image sensor 18. As a result, the contacted area 28 of input region 15 appears darker than other areas of the input region 15.

In some embodiments, data processor 20 determines the indicium that is most likely to have been selected by the user based on a "center of mass" calculation as follows. Initially, pixel values (e.g., gray level values) in the input region 15 are acquired from image sensor 18. The pixel values then are segmented into two groups based on a threshold. For example, in the case of gray level pixel values, pixels with values that are less than 128 are assigned to a "black" pixel group, and pixels with values greater than or equal to 128 are assigned to a "white" pixel group. The threshold value that provides the most accurate results may be determined experimentally. The $x_{cm}$ and $y_{cm}$ coordinates corresponding to the center of mass of the contacted area 28 are computed as follows:

$$x_{cm} = \frac{\sum_{\forall n = BlackPixels} x_n}{N_{BlackPixels}}$$

$$y_{cm} = \frac{\sum_{\forall n = BlackPixels} y_n}{N_{BlackPixels}}$$

where $x_n$ and $y_n$ are the x and y coordinate values for the black pixels and $N_{BlackPixels}$ is the number of black pixels. Data processor 20 then compares the center of mass coordinates ($x_{cm}$, $y_{cm}$) to the pixel locations of the indicia 16 to determine which indicium 16 is the most likely to correspond to the selected indicium. For example, in some embodiments, distances between the center coordinates of each indicium 16 and the computed center of mass coordinates ($x_{cm}$, $y_{cm}$) are computed, and the indicium corresponding to the shortest distance is selected as the mostly likely to have been selected by the user. The mapping between center coordinates for the indicia and input image regions may be stored, for example, in a pre-generated look-up table.

In some embodiments, data processor 20 determines the indicium that is most likely to have been selected by the user based on an "edge detection" process as follows. Initially, pixel values (e.g., gray level values) in the input region 15 are acquired from image sensor 18. Next, horizontal (x-coordinate) and vertical (y-coordinate) gradient values ($g_x(x)$, $g_y(y)$) are computed as follows:

$$g_x(x) = \left| \sum_{\forall y} I(x, y) - \sum_{\forall y} (x+1, y) \right|$$

$$g_y(y) = \left| \sum_{\forall x} I(x, y) - \sum_{\forall x} (x, y+1) \right|$$

where $I(x, y)$ is the pixel value at pixel location (x, y). Peaks in the horizontal and vertical gradient values may be used to find the left, right, top, and bottom edges of contact area 28. Coordinates for a pixel that is representative of the most likely selected contact area may be computed based on the detected gradient peaks. For example, in some embodiments, the x coordinate of the representative pixel may be located midway between the two horizontal gradient peaks and the y coordinate of the representative pixel may be located midway between the two vertical gradient peaks. In some embodiments, the location of the representative peak relative to the computed horizontal and vertical gradient peaks may be determined experimentally. Data processor 20 then compares the coordinates of the representative pixel to the pixel locations of the indicia 16 to determine which indicium 16 is the most likely to correspond to the selected indicium. For example, in some embodiments, distances between the center coordinates of each indicium 16 and the computed representative pixel coordinates are computed, and the indicium corresponding to the shortest distance is selected as the mostly likely to have been selected by the user. The mapping between center coordinates for the indicia and input image regions may be stored, for example, in a pre-generated look-up table.

In some embodiments, a training algorithm is used to identify the indicium that is most likely to have been selected by the user. In these embodiments, a user may be prompted to select each of the indicia in sequence. For each indicium, the x and y coordinates for the center of mass or the representative pixel (or both) are computed as described above. These coordinates are stored in a lookup table. After the training session has been completed, these stored coordinates may be used to determine the indicium most likely to have been selected by the user. For example, in some embodiments, distances between the stored coordinates associated with each indicium 16 and the computed center of mass or representative pixel coordinates (or both) are computed, and the indicium corresponding to the shortest distance is selected as the mostly likely to have been selected by the user.

In some embodiments, two or more of the above-described methods of identifying indicia most likely to have been selected by a user may be used in combination.

Because data input system 10 determines selected indicia based on optical techniques rather than actual key depression, input region 15 may be implemented with an area that is substantially smaller than the key-based data input systems of most conventional electronic devices. For example, in some implementations, each indicium 16 may occupy an area in the input region 15 that is on the order of about 2 mm×2 mm (or 4 square millimeters). In the illustrated embodiment, the indicia 16 are substantially smaller than the contact area 28 between finger 26 and contact surface 14. As a result, the contact area 28 overlaps the areas corresponding to multiple indicia 16 at the same time. However, a unique indicium still may be identified using one of the above-described data input processing techniques.

Figure 4:
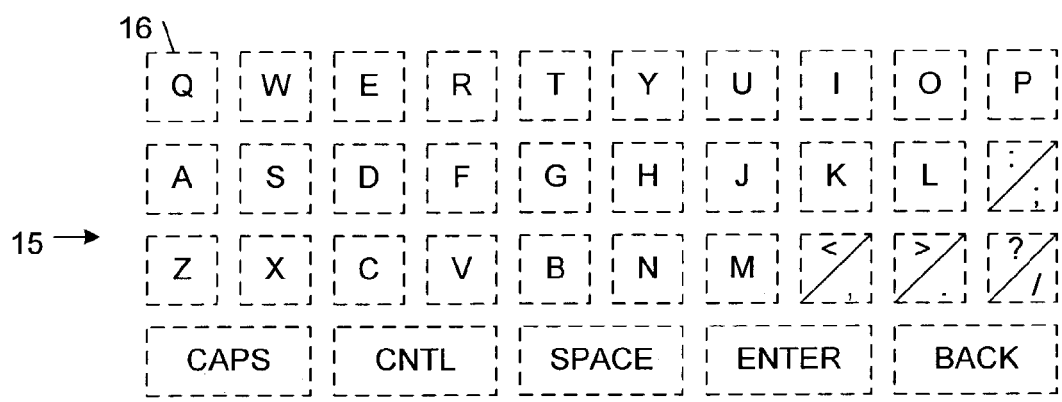
FIG. 4 is a diagrammatic view of an input region containing multiple indicia representing keys of a handheld computer keyboard.
Figure 5A:
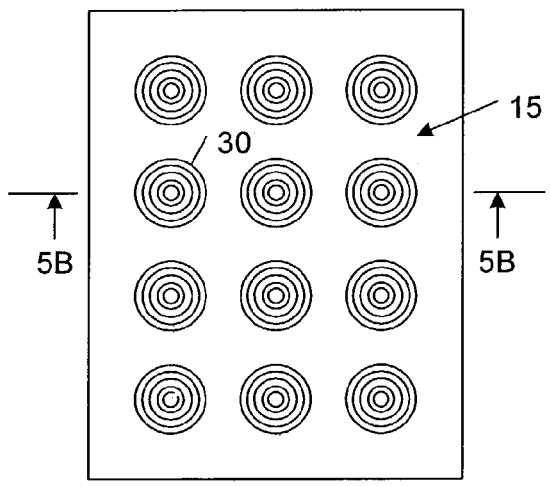
FIG. 5A is a diagrammatic top view of a window having a contact surface with multiple depressions.
Figure 5B:
FIG. 5B is a diagrammatic cross-sectional side view of the window of FIG. 5A taken along the line 5B—5B.
Figure 6A:
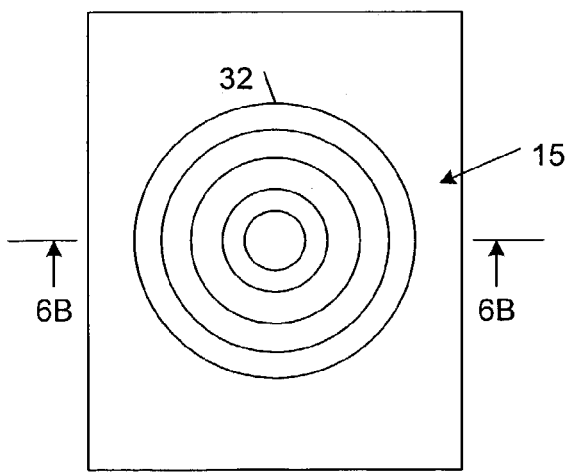
FIG. 6A is a diagrammatic top view of a window having a contact surface with a central bump.
Figure 6B:
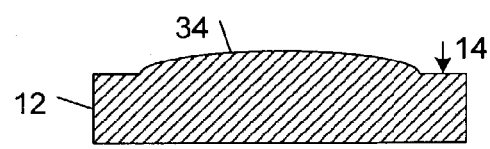
FIG. 6B is a diagrammatic cross-sectional side view of the window of FIG. 6A taken along the line 6B—6B.

As shown in FIG. 4, in some embodiments, indicia 16 may correspond to the keys of a computer keyboard. In these embodiments, one or more of the above-described techniques may be used alone or in combination to determine the indicia that have been selected by a user. In some embodiments, multiple image sensors 18, each configured to capture images of a respective area of input region 15, may be required to image the entire input region 15.

Referring to FIGS. 5A, 5B, 6A, and 6B, in some embodiments, contact surface 14 of window 12 may include one or more orientation features that tactilely guide the user to different areas of input region 15. The embodiment of FIGS. 5A and 5B, for example, includes multiple perceptible depressions 30 in contact surface 14. Each depression 30 may be centered at a location corresponding to a respective indicium. The embodiment of FIGS. 6A and 6B, on the other hand, includes a single bump 32 that is located in the center of input region 15. Other orientation feature implementations are possible.

Figure 7A:
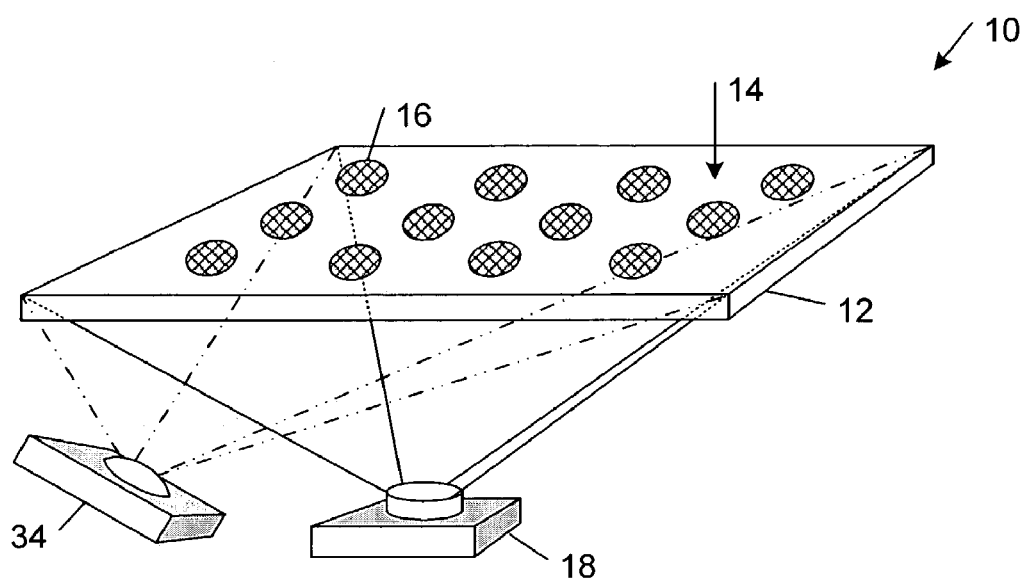
FIG. 7A is a diagrammatic view of the data input system of FIG. 1 and a light source illuminating the contact surface through the window.
Figure 7B:
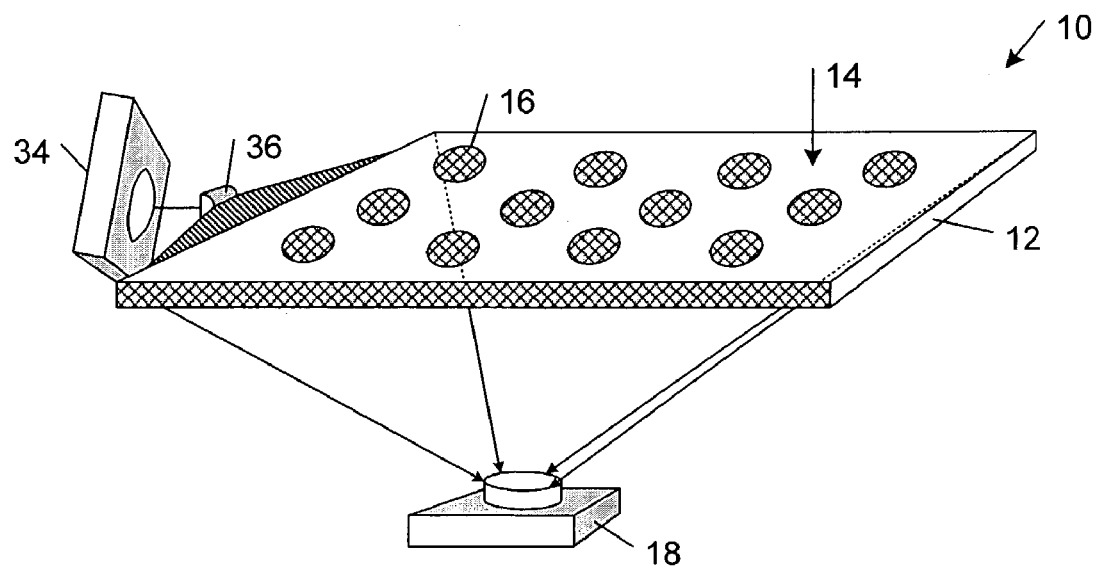
FIG. 7B is a diagrammatic view of the data input system of FIG. 1 and a light source injecting light into an edge of the window.

Referring to FIGS. 7A and 7B, in some embodiments, data input system 10 may include a light source 34 (e.g., a light emitting diode). In the embodiment of FIG. 7A, light source 34 is configured to illuminate contact surface 14 through window 12. In this embodiment, light passes through window 12 except in areas where an object (e.g., a finger tip) is in contact with contact surface 14. The reflected light is captured by image sensor 18. In the embodiment of FIG. 7B, light source 34 is configured to inject light into an edge of window 12. An optical element 36 (e.g., a cylindrical lens) may be used to obtain a uniform injection of light into window 12. The injected light is retained within window 12 by total internal reflection except in an area where an object (e.g., a finger tip) is in contact with contact surface 14. Contact between an object and contact surface 14 disrupts the total internal reflection in the contact area, causing injected light from the contact area to be directed toward image sensor 18. The above-described methods of identifying indicia most likely to have been selected by a user may be used with the embodiments of FIGS. 7A and 7B. However, these methods should be modified to account for the fact that areas of contact between an object and contact surface 14 will appear lighter than other areas of the input region 15 in the images captured by image sensor 18.

Each of the embodiments of FIGS. 7A and 7B may include other optical elements. For example, light source may emit light within a narrow wavelength range and image sensor 18 may include a filter that selectively allows light within the narrow wavelength range to be detected. In this way, contrast in the input region images that are captured by image sensor 18 may be enhanced.

Figure 8:
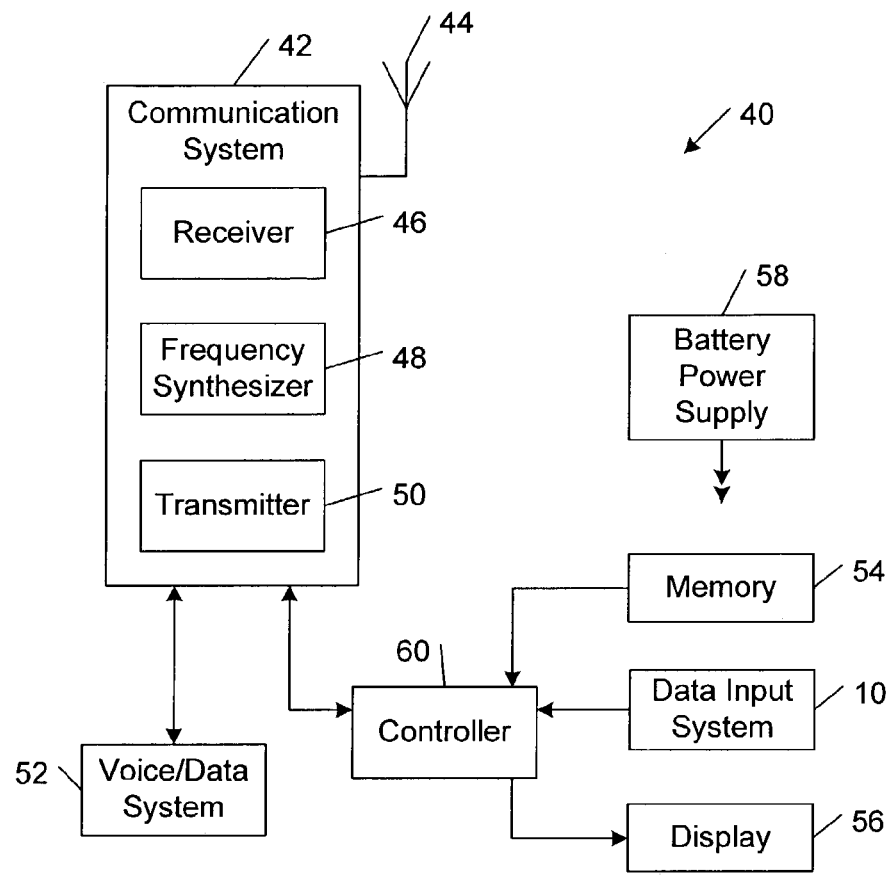
FIG. 8 is block diagram of a cellular telephone incorporating the data input system of FIG. 1.

Referring to FIG. 8, in one implementation, data input system 10 may be incorporated in a cellular telephone 40 that includes a wireless communication system 42 that has an antenna 44, a receiver 46, a frequency synthesizer 48, and a transmitter 50. Cellular telephone 40 also may have a voice/data system 52, a memory 54, a display 56, a battery power supply 58, and a controller 60 that choreographs the operation of cellular telephone 40. Wireless communication system 42 is configured to establish communication links with a wireless network in accordance with a conventional wireless protocol (e.g., a conventional analog cellular protocol or a digital wireless protocol, such as WAP).

Figure 9:
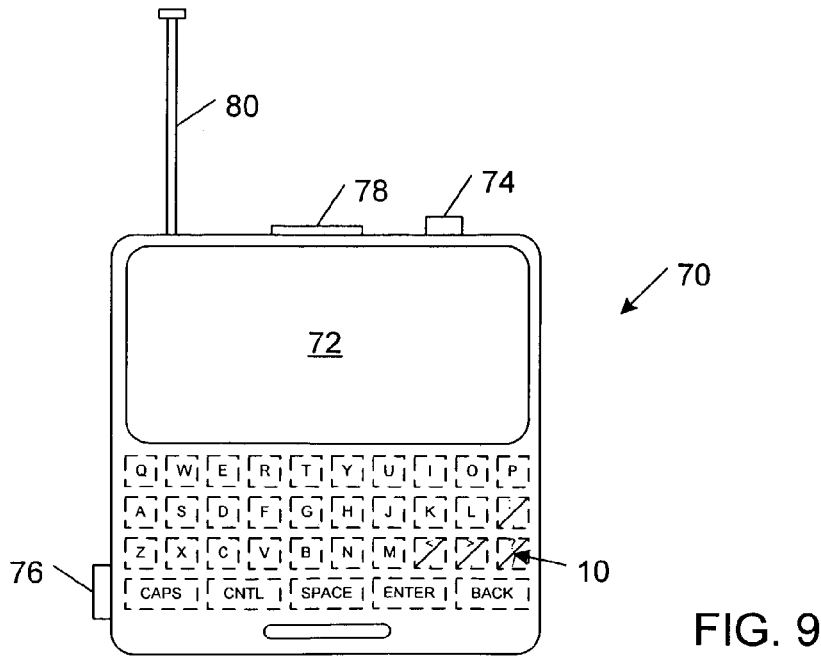
FIG. 9 is a block diagram of a handheld computer incorporating the data input system of FIG. 1.

Referring to FIG. 9, in some embodiments, data input system 10 may be incorporated into a handheld computer 70 (e.g., a personal digital assistant). Handheld computer 70 includes a screen 72 that displays a graphical user interface, which may present one or more user options for controlling the operation of handheld computer 70. Handheld computer 70 has an output port 74 for connecting to an input jack of an audio output device (e.g., headphones), and a cable port 76 for connecting to a computer or other hardware system. Handheld computer 70 further includes a wireless communication port 78, for example, an IrDA (Infrared Data Association) port, through which handheld computer 70 may wirelessly communicate with other similarly configured devices. Some embodiments may include an RF antenna 80 instead of, or in addition to, wireless communication port 78.

Other embodiments are within the scope of the claims.

For example, the exemplary methods of identifying areas of contact between an object and contact surface 14 that are described above may be modified or replaced by other known image processing techniques.

In some embodiments, data input processor 20 may be incorporated into image sensor 18 or into device electronics 24.

In some embodiments, data input system 10 may be incorporated into a digital audio player, a CD player, an MCD player, a game pad, a cordless telephone, a pager, a laptop computer, or other portable or non-portable electronic device.

The systems and methods described herein are not limited to any particular hardware or software configuration, but rather they may be implemented in any computing or processing environment, including in digital electronic circuitry or in computer hardware, firmware, or software.

What is claimed is:

1. An electronic device, comprising:
a window having a contact surface with an input region;
multiple indicia corresponding to respective markings viewable in the input region of the contact surface;
an image sensor constructed and arranged to capture images of the input region of the contact surface through the window; and
a data input processor coupled to the image sensor and operable to compute a central coordinate of an area of contact between an object and the contact surface in one of the captured images and to select as a user-selected indicium one of multiple ones of the indicia located within the contact area based on the central coordinate and a mapping between areas of the captured images and locations of the input indicia.

2. The device of claim 1, wherein the multiple input indicia resemble keys of a cellular telephone.

3. The device of claim 1, wherein the multiple input indicia resemble keys of a computer keyboard.

4. The device of claim 1, wherein the multiple input indicia correspond to markings on the contact surface.

5. The device of claim 1, wherein the contact surface comprises a single central bump in the input region.

6. The device of claim 1, wherein the contact surface comprises depressions at locations corresponding to respective ones of the indicia.

7. The device of claim 1, wherein the window is movable into and out of a field of view of the image sensor.

8. The device of claim 1, wherein the image sensor comprises a camera module.

9. The device of claim 8, wherein the camera module is operable to capture images of a scene beyond the window.

10. The device of claim 8, comprising multiple camera modules each operable to capture images of a respective area of the input region of the contact surface through the window.

11. The device of claim 1, wherein the data input processor is operable to compute coordinates of touched locations within the input region.

12. The device of claim 11, wherein the data input processor is operable to compute the central coordinate based on a computation of center of mass of the touched location coordinates.

13. The device of claim 11, wherein the data input processor is operable to compute the central coordinate based on computations of edges of the contact area.

14. The device of claim 13, wherein the data input processor is operable to compute the central coordinate based on computations of edges of an area of contact between the contact surface and a fingertip contacting the contact surface.

15. The device of claim 11, wherein the data input processor is operable to compute coordinates of touched locations within the input region based on determinations of areas of the input regions in which ambient light is shadowed by an object contacting the touch surface.

16. The device of claim 1, further comprising a light source.

17. The device of claim 16, wherein the light source is operable to illuminate the contact surface through the window.

18. The device of claim 16, wherein the light source is operable to inject light into an edge of the window, wherein injected light is retained by total internal reflection.

19. The device of claim 1, wherein each indicium occupies in the input region an area on the order of about 2 mm×2 mm.

20. The device of claim 1, wherein the electronic device corresponds to a cellular telephone.

21. The device of claim 1, wherein the electronic device corresponds to a handheld computer.

* * * * *